United States Patent [19]

Walkley et al.

[11] 3,759,382
[45] Sept. 18, 1973

[54] METHOD, APPARATUS AND SYSTEM FOR FITNESS SORTING AND COUNT VERIFYING STRAPS OF CURRENCY

[75] Inventors: James A. Walkley, Bridgeport; Peter N. Piotroski, Stamford; George W. O'Gara, Danbury, all of Conn.

[73] Assignee: Pitney-Bowes, Inc., Stamford, Conn.

[22] Filed: Sept. 16, 1971

[21] Appl. No.: 181,164

[52] U.S. Cl. .................... 209/111.7, 209/DIG. 2
[51] Int. Cl. .............................. B07c 5/342
[58] Field of Search ............. 209/111.6, 111.7, 209/75, DIG. 2; 356/201; 250/219 DQ

[56] References Cited
UNITED STATES PATENTS

| | | |
|---|---|---|
| 2,731,621 | 1/1956 | Sontheimer ...................... 340/149 |
| 2,922,893 | 1/1960 | Ett ..................................... 250/219 |
| 3,122,227 | 2/1964 | Bookout ...................... 209/111.6 X |
| 3,220,549 | 11/1965 | Wong ................................ 209/111.6 |
| 3,480,785 | 11/1969 | Aufderheide ................ 209/111.6 X |
| 3,536,927 | 10/1970 | Mink ............................. 209/111.6 X |
| 3,412,993 | 11/1968 | Giori ............................. 250/219 DQ |
| 3,491,243 | 1/1970 | Tsugami ....................... 250/219 DQ |
| 3,589,514 | 6/1971 | Townsend ..................... 209/111.7 X |

Primary Examiner—Richard A. Schacher
Attorney—William D. Soltow, Jr. et al.

[57] ABSTRACT

Currency is sorted according to fitness by monitoring the transparency of a predetermined, limited area of each bill to blue light while in transit through a monitoring station. A photosensor, responsive to the transmittance of blue light through each bill, controls the position of a gate to route fit and unfit bills into separate hoppers. Counters are provided to maintain counts of the fit and unfit bills, as well as to verify the strap count of straps of currency being sorted.

12 Claims, 8 Drawing Figures

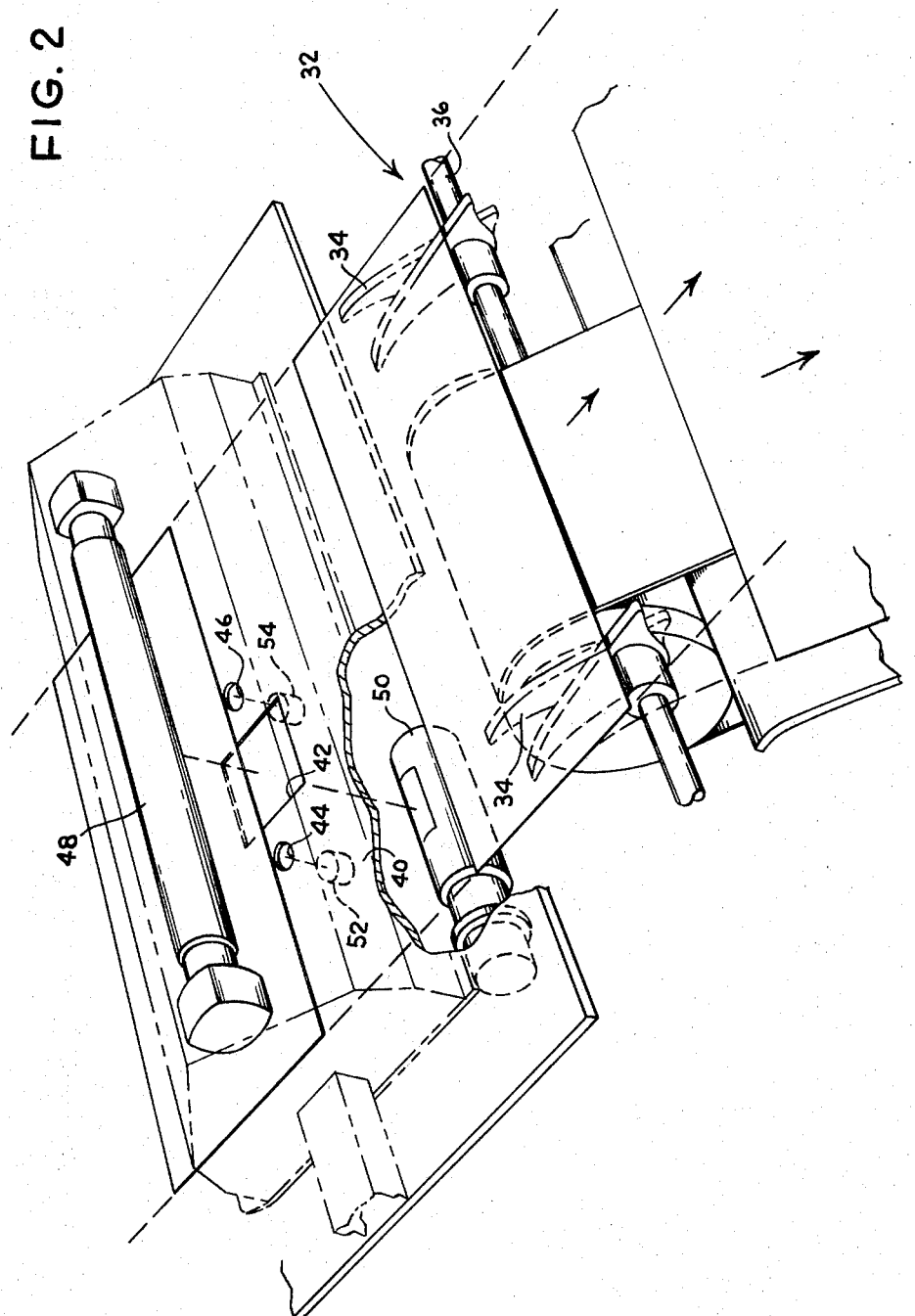

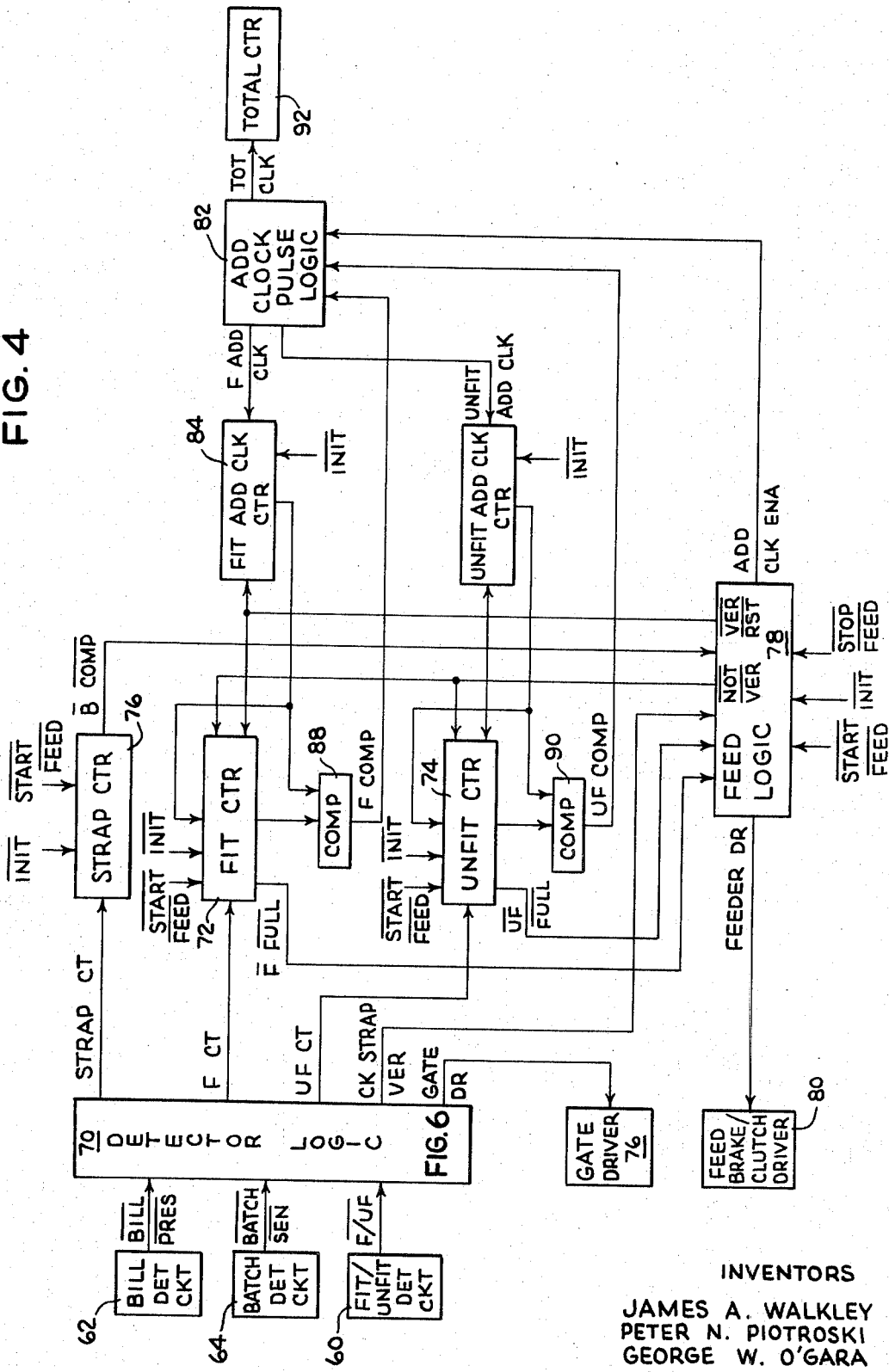

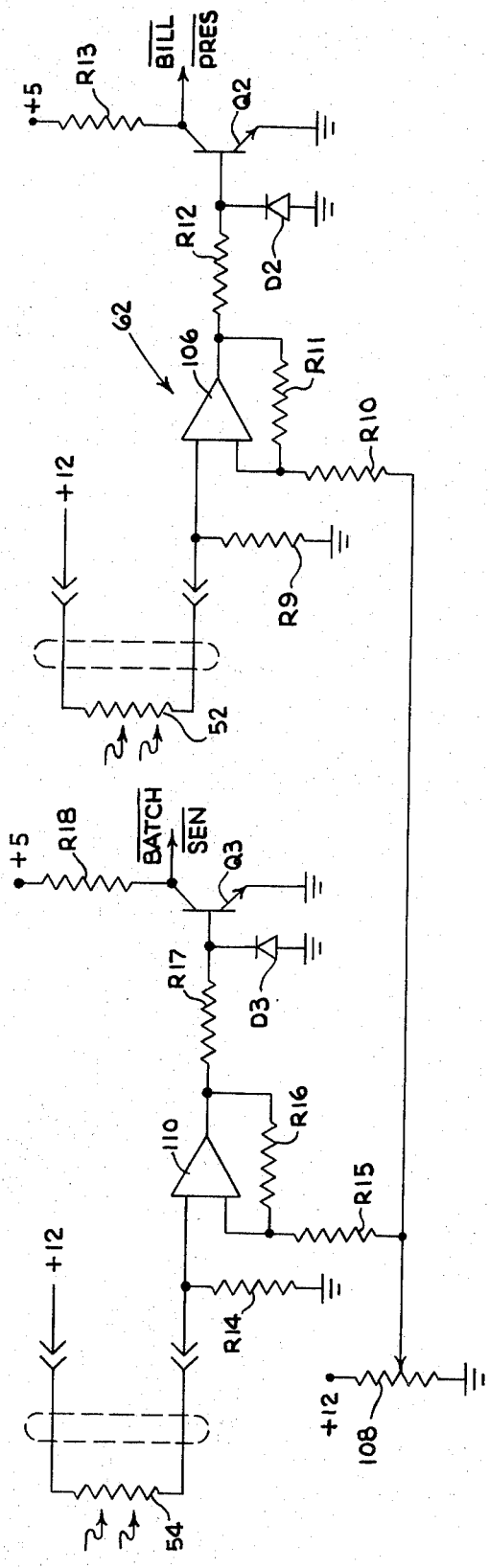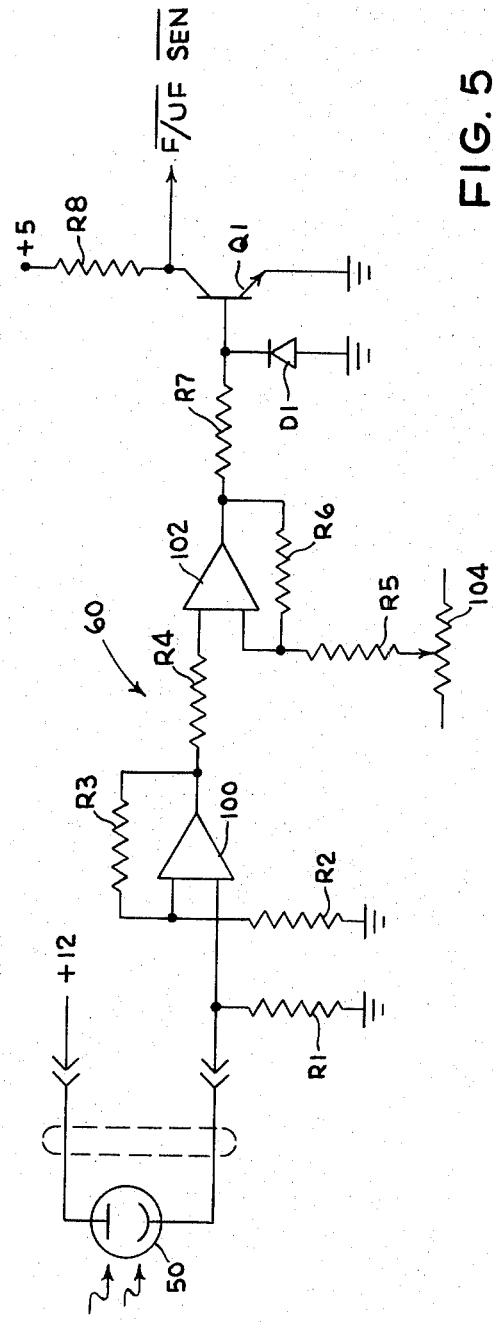
FIG. 5

METHOD, APPARATUS AND SYSTEM FOR FITNESS SORTING AND COUNT VERIFYING STRAPS OF CURRENCY

BACKGROUND OF THE INVENTION

Sorting currency according to fitness for continued circulation is presently being performed manually. This task is performed by many people in locations throughout the country and thus standardization is quite impossible. Since many millions of dollars of currency are removed from circulation daily for destruction, this task is a formidable one requiring a significant number of man hours of rather tedious effort by reasonably trained personnel.

To expedite this operation, some banks have adopted the practive of merely examining the edges of bills stacked in batches of 100, termed "straps", and if, from the physical appearance of the edges of the bills, it is judged that the majority are unfit, the entire strap is removed from circulation. Obviously, a goodly number of fit bills are needlessly removed from circulation by this practice.

In addition to the sorting of currency according to fitness, an accurate accounting of the fit and unfit bills must be maintained, particularly when the bills are examined individually. The unfit bills must be batched in straps of one hundred for transmittal to the Bureau of Printing and Engraving for destruction. This requires that the unfit bills be accurately counted, either manually or mechanically. Typically, the fit bills emanating from the sorting process are also counted into straps of one hundred pursuant to their re-entry to circulation. This counting operation is necessary not only to permit batching the fit and unfit bills into straps, but also to verify that the straps of currency entering the sorting process did in fact each contain one hundred bills.

This requisite accounting operation obviously adds to the time and thus expense of sorting currency for fitness.

It is accordingly an object of the present invention to provide a method and apparatus wherein a standard may be readily established for reliably evaluating the fitness of currency.

An additional object of the present invention is to provide a method and apparatus of the above character for automating the operation of sorting currency according to fitness.

A further object of the invention is to provide a system of the above character for automatically accounting for the numbers of fit and unfit bills incident to the automated sorting of currency according to fitness.

Other objects of the invention will in part be obvious and in part appear hereinafter.

SUMMARY OF THE INVENTION

One of the principles of the present invention resides in the discovery that as currency continues in circulation it becomes increasingly opaque to certain wavelengths of electromagnetic radiation. This is believed to result from the progressive change in optical properties due to the aging of the paper and the accumulation of oils and grime incident to handling. This phenomenon is found to be most pronounced around 4,800 angstroms, which corresponds to the blue region of the visible spectrum. Thus, the amount of blue light transmitted through a bill is indicative of the degree of its fitness or conversely the degree of its unfitness. That is, a new bill is relatively transparent to blue light, while a wholly unfit bill is virtually opaque to blue light. Somewhere between these two extremes, a standard to threshold degree of transparency may be readily established and used as a basis for sorting fit and unfit bills.

The same phenomenon has been observed for red light, but not as pronounced as for blue light. It will be appreciated that the degree of transparency to other wavelengths of electromagnetic radiation and even other types of radiation may also be found to vary over an appreciable range in accordance with fitness, and thus be efficacious for monitoring the fitness of currency.

To automate the sorting process in accordance with the present invention, currency is fed seriatim through a monitoring station where the transparency (or conversely, opacity) of each bill is separately tested. The monitoring station includes a source of radiation to which the currency exhibits a degree of transmittance indicative of its relative fitness or unfitness. Preferably the source radiates blue light. The monitoring station further includes a radiation sensor positioned so as to be responsive to the radiation transmitted through each bill while in transit through the monitoring station. The response of the radiation or fitness sensor is converted to a proportional electrical signal which is used to control the position of a gate or diverter for appropriately routing the bills emanating from the monitoring station into separate hoppers where the fit an unfit bills are accumulated.

To establish the standard by which the bills are sorted for fitness, the electrical response of the sensor is, in effect, compared with a reference signal. If the sensor electrical response exceeds the reference signal amplitude, the gate is controlled to route the particular bill into the fit hopper. On the other hand, if the sensor electrical response falls below the reference signal amplitude, the gate is controlled to route the particular bill into the unfit hopper. It will be appreciated that the reference signal amplitude may be conveniently adjusted to establish any desired standard which each bill must meet to be considered fit, and the sorting process will be carried out on that basis.

Rather than monitor the transparency of the entire bill, it has been found desirable to monitor only a predetermined, limited area of each bill. Moreover, it has been found that the optimum fitness monitoring area of a bill is its central portion encompassing the portrait.

To this end, a bill, upon entry into the monitoring station, triggers a detector whose response is utilized to derive a gating signal of predetermined duration which is employed, in turn, to insure that the central portion of the bill is aligned between the source and the sensor before the sensor response is effective to control the gate position.

Further, in accordance with the present invention, various counters are provided for counting the fit and unfit bills as they are sorted into their respective hoppers. Basically, the detector triggered by the passage of each bill through the monitoring station develops a pulse which is accumulated in either a fit counter or an unfit counter, depending upon the response of the fitness sensor.

It is contemplated that the currency to be sorted for fitness is fed seriatim through the monitoring station from batches or straps of one hundred bills. To verify that a strap of currency just sorted according to fitness did in fact originally contain 100 bills, a separate strap counter is provided to accumulate the detector pulse generated in response to the passage of each bill through the monitoring station. If the strap counter registers 100 after the last bill of a strap has passed through the monitoring station, it is verified that the strap just sorted properly contained 100 bills.

In order that the system of the invention may accommodate plural straps of currency in an input hopper from which the bills are fed seriatim through the monitoring station and yet facilitate the regrouping of sorted bills back into an original strap which has been detected as not having its full complement of one hundred bills, a pair of batch separator cards are used to segregate the currency straps in the input hopper. One separator card of each pair is provided with the optical characteristics of a fit bill, such that, upon passage through the monitoring station, it is routed to the fit hopper. The other batch separator card of each pair has the optical characteristics of an unfit bill and it is thus routed to the unfit hopper. Thus, these separator cards not only segregate the straps in the input hopper, but also the stored bills of each strap as accumulated in the two output hoppers.

In addition, the batch separator cards are suitably, distinctively keyed so as to trigger a separate batch detector upon passage through the monitoring station. The triggering of the batch detector signals the system to determine if the strap counter did in fact count 100 bills in the strap which has just been sorted for fitness. If count vertification is achieved, the system continues on to automatically sort the next strap for fitness. However, if verification is not achieved, the system automatically stops and the operator retrieves the sorted bills from the output hoppers and rebuilds the strap for recounting.

The system of the present invention further includes a pair of additional counters which operate in conjunction with the fit and unfit counters. When the count of each strap is verified, the fit and unfit counts accumulated respectively in the fit and unfit counters are, in effect, transferred to these additional counters. However, if count verification is not achieved, these additional counters are implemented to return the fit and unfit counters to the fit and unfit counts they registered prior to the sorting of the last strap.

Additionally, in accordance with the invention, the fit and unfit counters are implemented to halt the sorting operation as each reaches the count of 100. This permits the operator to insert a strap separator card in the appropriate output hopper and then restart the sorting operation. Later the operator can, on the basis of the strap separator cards, retrieve fit and unfit bills from the output hoppers in straps of one hundred bills.

The invention accordingly comprises the several steps and the relation of one or more of such steps with respect to each of the others and the apparatus embodying features of construction, combination of elements and arrangement of parts which are adapted to effect such steps, all as exemplified in the following detailed disclosure and the scope of the invention will be indicated in the claims.

For a fuller understanding of the nature and objects of the invention, reference should be had to the following detailed description taken in connection with the accompanying drawings, in which:

FIG. 2 is a perspective view of the monitoring station of FIG. 1;

FIG. 4 is a functional block diagram of the fitness sorting and count verification system constructed in accordance with a preferred embodiment of the invention;

FIG. 5 is a detailed circuit diagram of the detector signal processing circuitry of FIG. 4;

Corresponding reference numerals refer to like parts throughout the several views of the drawings.

DETAILED DESCRIPTION

Figure 1:
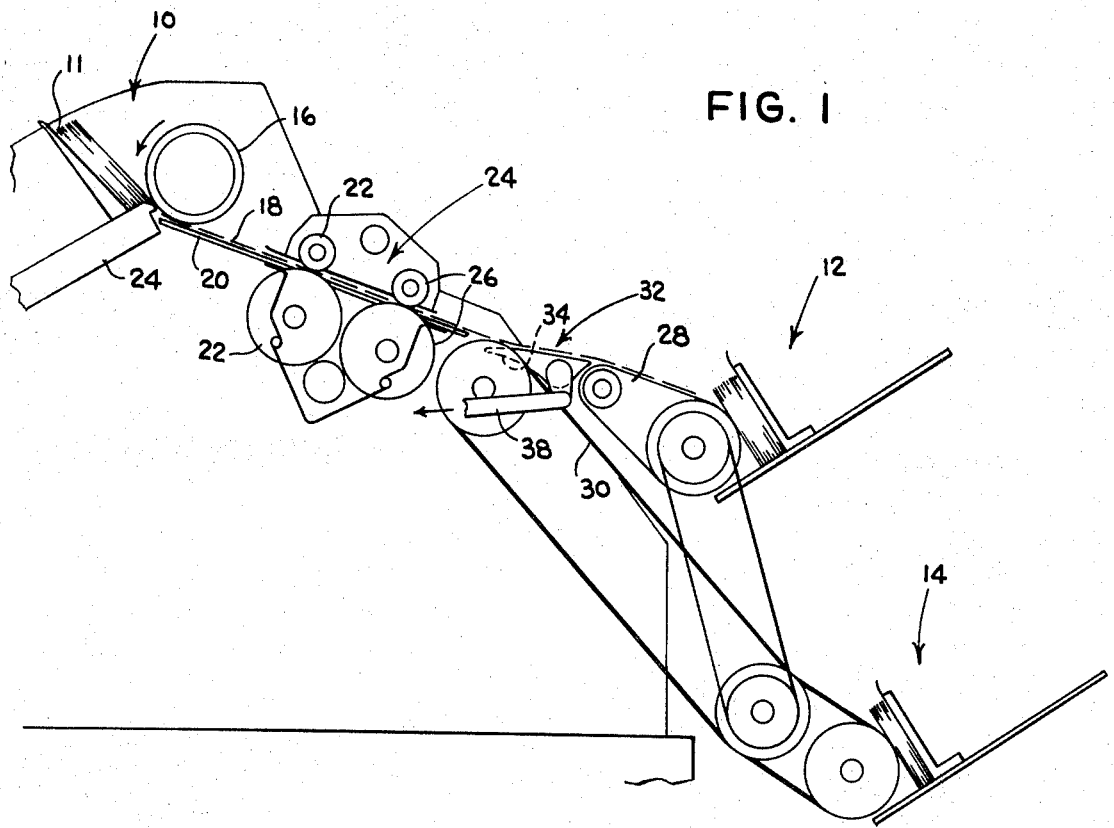
FIG. 1 is a fragmentary, side elevational view of apparatus for feeding currency seriatim through a monitoring station pursuant to sorting the currency into separate output hoppers according to fitness.

Referring first to FIG. 1, the currency feeding apparatus utilized in the present invention includes an input hopper, generally indicated at 10, for accommodating one or more straps 11 of currency to be sorted for fitness and a pair of output hoppers, specifically, an unfit hopper, generally indicated at 12, for accumulating unfit bills and a fit hopper, generally indicated at 14, for accumulating fit bills. A rotating feed wheel 16 separates the top bill from strap 11 in the input hopper 10 and feeds it along a feedpath, indicated by dash line 18 and defined by a pressure guide plate 20, to the nip of a pair of feed rollers 22. A knife edge 24 positioned in closely spaced relation to the periphery of feed wheel 16 insures that the bills are separated from strap 11 and fed along feedpath 18 at one at a time.

Beyond feed roller pair 22, the bills entering a monitoring station, generally indicated at 24. The bills are fed from the monitoring station by a feed roller pair 26 and deposited on a conveyor 28 leading to the unfit hopper 12 or onto a conveyor 30 leading to the fit hopper 14, depending upon the position of a gate mechanism, generally indicated at 32. As best seen in FIG. 2, the gate mechanism 32 includes a pair of spaced diverter or gate elements 34 mounted on a shaft 36. When the gate elements are in their down position shown in FIG. 1, it is seen that the bills are routed over their upper edges onto conveyor 28 and thence to the unfit hopper 12. When the gate elements 34 are rocked upwardly via linkage 38 (FIG. 1), the bills leaving the monitoring station 24 are routed downwardly by their lower edges onto conveyor 30 for deposit in the fit hopper 14.

As will be seen more clearly from the description to follow, the convention has been adopted that the position of the gate elements 34 seen in FIG. 1 is their quiescent or unactuated position and they are pivoted upwardly to their actuated position to divert a bill downwardly onto conveyor 30 in response to the detection of a fit bill passing through the monitoring station 24.

However, if the bill passing through the monitoring station is detected as being unfit, the gate mechanism 32 is not actuated and the gate elements remain in their quiescent positions to route the bill onto conveyor 28. It will be appreciated that this convention can be readily reversed, such that fit bills are accumulated in hopper 12 and unfit bills in output hopper 14.

The monitoring station 24, as best seen in FIG. 2, includes a deck 40 over which the bills successively pass. A fitness sensing window 42 straddled by a bill present sensing window 44 and a batch sensing window 46 are formed in deck 40. Spaced above deck 40 in optical alignment with these sensing windows is a radiation source 48, which may take the form of a fluorescent tube specifically adapted to emit radiation of the type uniquely suited to monitor currency fitness. In accordance with the present invention, as generally disclosed above, the optimum fitness monitoring radiation has been discovered to be light in the blue region of the visible spectrum. Less desirable, but nevertheless operable, is red light. It will be appreciated that the radiation source may either emit blue light directly or white light which is suitably filtered so that the bills passing through the monitoring station are irradiated with the blue light portion thereof.

Still referring to FIG. 2, the amount of blue light transmitted through the bills as they pass consecutively through the monitoring station 24 is detected by a suitable fitness sensor 50 positioned below deck 40 in optical alignment with fitness sensing window 42. A suitable fitness sensor may be a 934 vacuum phototube which is found to be quite sensitive to the portion of the visible spectrum encompassing blue light. The variation in transmittance of currency to blue light is of sufficient latitude to permit the use of an inexpensive vacuum phototube. This is not found to be the case for other wavelengths of electromagnetic radiation and thus a more expensive radiation sensor such as a photomultiplier tube, is required. Also positioned below deck 40 is a photosensor 52 in optical alignment with the bill present sensing window 44. As will be seen more clearly from the description to follow, the optical coupling between source 48 and bill present photosensor 53 is broken or at least sufficiently attenuated by the leading edge of a bill passing through the monitoring station 24 such that this photosensor derives a manageable signal signifying that a bill has indeed arrived for fitness sorting.

Figure 3:
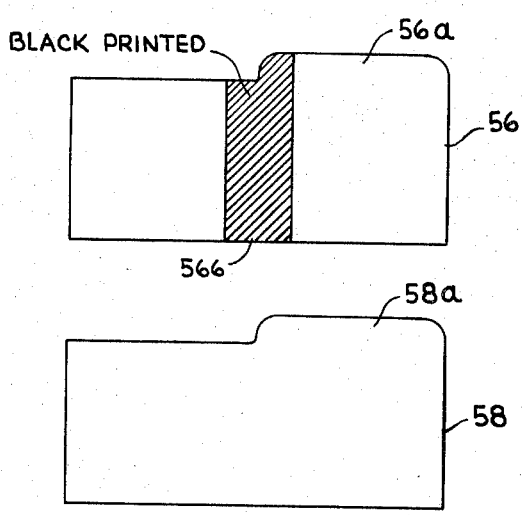
FIG. 3 is a front view of a pair of batch separator cards for use in conjunction with the apparatus of FIG. 1.

A third photosensor 54 is positioned below deck 40 in optical alignment with the batch sensing window 46 and source 48. Since windows 44 and 46 are laterally aligned, as long as bills are passing through the monitoring station 24, the timing of the electrical response of batch sensing photosensor 54 matches that of the bill present photosensor 52. However, one aspect of the present invention contemplates using a pair of batch separator cards such as shown in FIG. 3 to segregate the currency straps both in the input hopper and the two output hoppers. Batch separator card 56 is provided with a body of the same size, shape and thickness as the bills being sorted, except for a raised tab 56a. Bond paper is found to be satisfactory in forming the batch separator cards. Batch separator card 58 is of the same dimensions as batch separator card 56 and is provided with a corresponding raised tab 58a. As was previously generally discussed, a pair of batch separator cards are utilized to segregate the straps accommo-dated in input hopper 10. One batch separator card of each pair is a card 56 whose central portion is substantially opaque to the radiation of source 48, rendered so by virtue of, for example, a printed black stripe 56b, while the other is a card 58 which is substantially transparent. Thus, when these batch separator cards pass through the monitoring station 24 one in succession at the conclusion of the sorting of each strap 11, card 58 is routed by the gating mechanism 32 into the fit hopper 14, while card 56 is routed into the unfit hopper 12.

The batch separator cards 56 and 58 are fed through the monitoring station with their bottom straight edges as their leading edges. The tabs 56a and 58a are positioned along their trailing edges such that they are aligned with the batch sensing window 46 during passage through the monitoring station. Consequently, when the batch separator cards pass through the monitoring station, the optical coupling between source 48 and bill present photosensor 52 is re-established in advance of the time that the optical coupling between the source and batch sensing photosensor 54 is re-established. Thus by, in effect, comparing the electrical responses of photosensors 52 and 54, the system can distinguish between the passage of currency and the passage of batch separator cards through the monitoring station 24.

The basic operation of the system of the present invention can best be comprehended from a discussion of the generalized, overall block diagram of FIG. 4. Fit-/unfit detector circuitry 60, seen in detail in FIG. 5, processes the electrical response of the fitness photosensor 50 (FIG. 2) to provide a pulse signal input $\overline{F/UF}$ to detector logic, generally indicated at 70 and shown in detail in FIG. 6. The electrical response of the bill present photosensor 52 is processed by bill detection circuitry 62 of FIG. 5 to provide a signal pulse $\overline{BILL\ PRES}$ to the detector logic 70. The electrical response of the batch sensing photosensor 54 is processed in batch detector circuitry 64 of FIG. 5 to develope a signal pulse input $\overline{BATCH\ SEN}$ to the detector logic 70.

The fit/unfit sense pulse input $\overline{F/UF}$ is processed by the detector logic 70 in conjunction with the bill present pulse input $\overline{BILL\ PRES}$ to appropriately derive fit count pulse outputs F CT, which are accumulated in a fit counter 72, and unfit count pulses UF CT, which are accumulated in an unfit counter 74. That is, when the fit/unfit sense pulse input $\overline{F/UF}$ indicates that the bill passing through the monitoring station is fit, a fit count pulse F CT is generated to increment the fit counter 72. By the same token, if the fit/unfit sense signal pulse input $\overline{F/UF}$ indicates that the bill passing through the monitoring station is unfit, an unfit count pulse UF CT is generated to increment the unfit counter 74.

At the same time, the fit/unfit sense signal pulse input $\overline{F/UF}$ is also processed by the detector logic 70 to derive a gate drive output signal GATE DR, for selectively controlling the energization of a gate driver 76, whose actuating component may comprise a solenoid with its plunger operatively connected to the linkage 38 for gate mechanism 32 (FIG. 1). Thus, either the fit counter 72 or the unfit counter 74 is incremented while the gate mechanism 32 is appropriately positioned to route the bill exiting from the monitoring station into either the fit hopper or the unfit hopper, as the situation requires.

Still referring to FIG. 4, regardless of whether a fit count pulse F CT is supplied to the fit counter or an unfit count pulse UF CT is supplied to the unfit counter, a strap count pulse STRAP CT is generated to increment a strap counter 76. Thus, the strap counter accumulates the count of the bills, whether fit or unfit, as they pass through the monitoring station.

The strap counter 76 may take the form of a binary coded decimal (BCD) pulse counter consisting of a units digit stage and a tens digit stage. When the content of the strap counter 76 reaches one hundred, occurring when the units and tens digit stages concurrently go from decimal nine to zero, an output B COMP is supplied to feed logic circuitry 78, detailed in FIG. 7. Also supplied to the feed logic circuitry 78 are check strap verification pulses CK STRAP VER generated by the detector logic 70 in response to the passage of each batch separator card 56 and 58 through the monitoring station. As will be seen from FIG. 6 the check strap verification pulses are derived by, in effect, time comparing the bill present signal pulse input $\overline{\text{BILL PRES}}$ and the batch sense signal pulse input signal $\overline{\text{BATCH SEN}}$. When the feed logic circuitry 78 detects a lack of coincidence between the check strap verification pulses and the B COMP signal from strap counter 76, thereby signifying that the strap of currency just sorted for fitness did not contain 100 bills, the feed logic transmits a signal FEED DR to a feed brake/clutch drive 80 to halt the feeding of currency from the input hopper by disengaging the clutch and engaging the brake, both included in the feed drive train. The operator then collects the sorted bills from the output hoppers 12 and 14 to rebuild the strap, which is then put aside. Eventually an investigation will be instituted to determine who is responsible for the shortage or overage.

If there is coincidence between the signals B COMP and CK STRAP VER, verification is obtained that the strap just sorted did in fact contain one hundred bills. The feed brake/clutch drive 80 is controlled by the feed logic 78 to proceed with the feeding of currency from the next strap in the input hopper.

Figure 7:
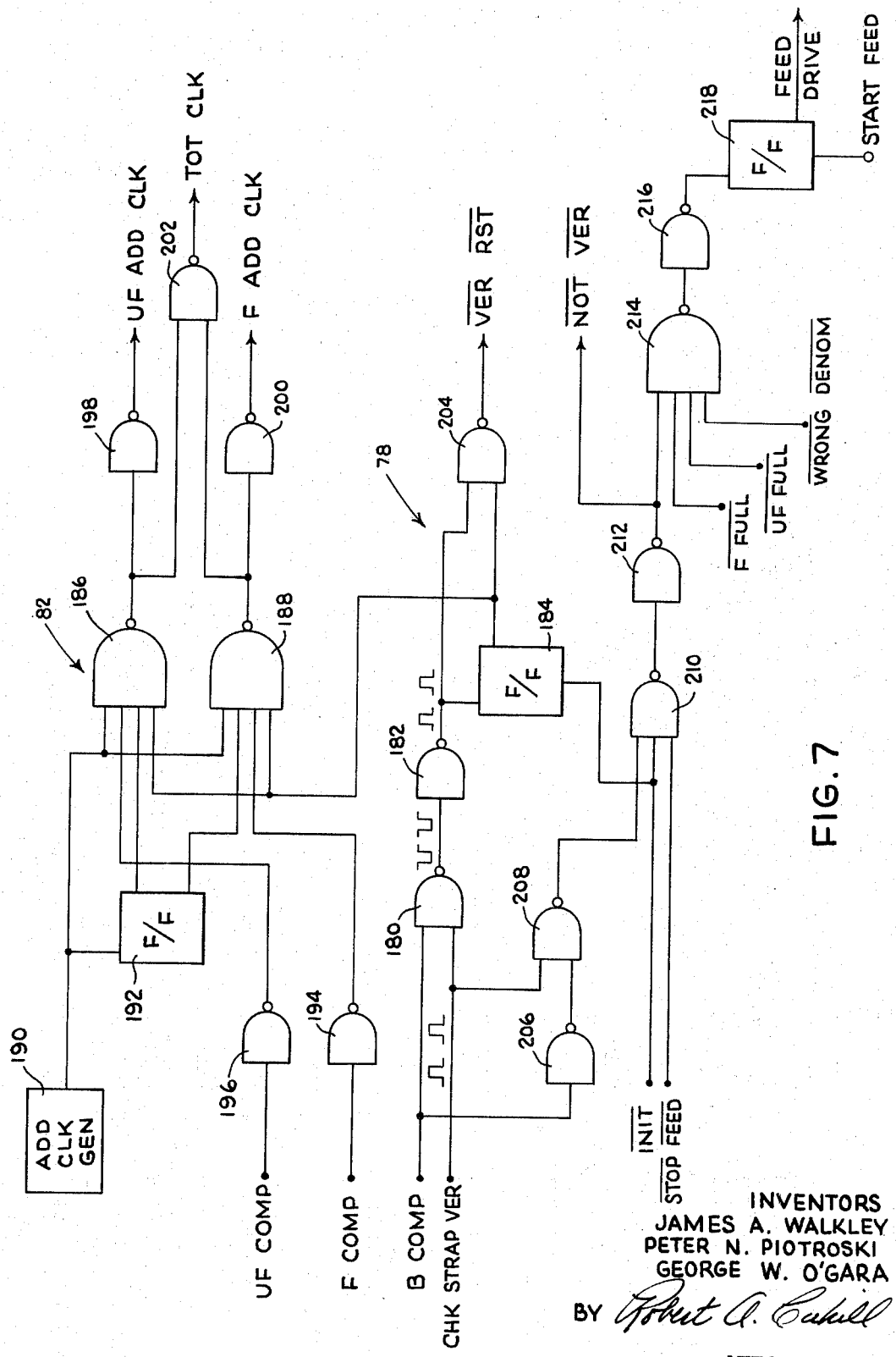
FIG. 7 is a detailed logic block diagram of the feed logic and add clock pulse logic circuitries of FIG. 4.

During the interval between the passage of the two batch separator cards, add clock pulse logic 82, seen generally in FIG. 4 and detailed in FIG. 7, is enabled by an add clock enable signal ADD CLK ENA issued by the feed logic 78 to generate a series of fit add clock pulse F ADD CLK. a series of unfit add clock pulses UF ADD CLK and a series of total count clock pulses TOT CLK. The fit add clock pulses are used to increment a fit add clock counter 84, which the unfit add clock pulses are employed to increment an unfit add clock counter 86. The contents of the fit counter 72 and the fit add clock counter 84 are compared in a comparator 88 whose output $\overline{\text{FIT COMP}}$ is fed back to the add clock pulse logic 82. The fit add clock counter 84 is incremented until its content equals that of the fit counter 72, whereupon the output of comparator 88 $\overline{\text{FIT COMP}}$ terminates the issuance of further fit add clock pulses. Similarly, the contents of the unfit add clock counter 86 and the unfit counter 74 are compared in a comparator 90 whose output $\overline{\text{UNFIT COMP}}$ is used to terminate the unfit add clock pulses when their contents compare.

As will become clear from the description to follow, the purpose of this operation is to, in effect, transfer the fit and unfit counts obtained from the strap just sorted from the fit and unfit counters respectively to the fit add clock and the unfit add clock counters if strap count verification was obtained. Thus, the fit and unfit counters serve to accumulate fit and unfit counts as the bills of a particular strap are being sorted, while the fit add clock and unfit add clock counters retain the count up through the previously sorted strap. This is done in order that, in the event the count of the strap just sorted is not verified, requiring that the sorted bills of this strap be removed from the output hoppers, the fit and unfit counts achieved prior to this strap are not lost. To this end, the feed logic 78, in addition to terminating the feeding of currency, generates a not verified signal $\overline{\text{NOT VER}}$ which is supplied to both the fit counter 72 and the unfit counter 74. The add clock enable signal ADD CLK ENA is not generated and thus the contents of the fit add clock and the unfit add clock counters are not disturbed. The not verified signal $\overline{\text{NOT VER}}$ is effective to condition the fit and unfit counters to read in the counter contents of the fit add clock and the unfit add clock counters, respectively. Thus, the fit and unfit counters are effectively returned or backdated to the counts they contained prior to the sorting of the last strap which proved not to contain one hundred bills.

For each fit add clock pulse and each unfit add clock pulse generated by the add clock pulse logic 82, a total count pulse TOT CLK is generated to increment a total counter 92, such that it maintains a count of the total number of fit and unfit bills as sorted from count verified straps.

As will be seen from the description to follow, after the fit add clock counter 84 and the unfit add clock counter 86 have been incremented to contain the count contents of the fit counter 72 and the unfit counter 74, respectively, the feed logic circuitry 78 issues a verification reset signal $\overline{\text{VER RST}}$ to these four counters for the purposes of resetting certain carry logic, preparatory for the sorting of the next strap.

As an additional feature of the invention, each time fit counter 72 accumulates a count of one hundred, a fit full signal $\overline{\text{F FULL}}$ is supplied to the feed logic circuitry 78, which responds by interrupting the feeding of currency. This affords the operator the opportunity to place a suitable strap separator card in the fit hopper 14, thus segregating the fit bills accumulated in the fit hopper into straps of 100. Similarly, each time the unfit counter 74 reaches a count of 100, an unfit full signal $\overline{\text{UF FULL}}$ is supplied to the feed logic circuitry 78, halting currency feed so that the operator can insert a strap separator card in the unfit hopper 12 to segregate the unfit bills into straps of 100.

To assist the operator, the contents of the fit and unfit counters, the strap counter and the total counter are preferably displayed.

The fit/unfit detector circuit 60, generally shown in FIG. 4, is disclosed in detail in FIG. 5. Th fitness photosensor 50, illustrated as a vacuum phototube, has its anode connected to a +12 volt supply and its cathode connected as one input to an operational amplifier 100. The phototube input lead is connected to ground through a resistor R1. The other input to operational amplifier 100 is referenced to ground through a resistor R2 and is also coupled to the amplifier output by a feedback resistor R3. The conductance of phototube 50 is directly proportional to the amount of incident radiation and thus to the degree of transparency of the bills passing through the monitoring station. The current flowing through phototube 50, a measure of its conductance, develops a proportional voltage across resistor R1, which is amplified by amplifier 100 and supplied through a resistor R4 as one input to an operational amplifier functioning as a comparator 102. The other reference input is obtained from the adjustable tap on a voltage divider 104 through a resistor R5. Resistor R6 is a feedback resistor. The output of comparator 102 is connected through a resistor R7 to the base of an output transistor Q1, whose emitter is grounded and collector is connected to a +5 volt supply through a resistor R8. Diode D1 allows the base to swing negative to the amplitude of the base-emitter voltage, thereby to turn transistor Q1 off.

As long as the fitness sensing window 42 (FIG. 2) is uncovered or covered by a fit bill, the level of conductance of phototube 50 is sufficient, as reflected by the output from comparator 102, to maintain transistor Q1 cut off. Consequently, the F/UF SEN output taken from the collector is at +5 volt or logical ONE level. However, when the amplified phototube output voltage at the input of comparator 102 falls below a predetermined level, determined by the reference or fitness standard voltage tapped from voltage divide 102, thereby signifying that an unfit bill is covering the fitness sensing window 42, transistor Q1 is abruptly driven into conduction. Consequently, the output F/UF SEN abruptly goes from +5 volts to 0 volts, or from a logical ONE to a logical ZERO. It is thus seen that the comparator 102, in addition to serving as a comparator, functions with output transistor Q1 as a pulse shaping network so as to provide the signal pulse input F/UF SEN to the detector logic 70 (FIG. 4) with sharp leading and trailing edges. It will also be observed that the tap voltage divider 104 is conveniently adjustable so as to readily establish a desired fitness standard as the basis for sorting.

Still referring to FIG. 5, the bill present photosensor 52 is illustrated as taking the form of photoresistor having one terminal connected to the +12 volt supply and its other terminal connected to ground through a resistor R9. The upper terminal of resistor R9 is connected as one input to an operational amplifier 106 functioning as a Schmidt trigger or threshold detector; its output obtained from the adjustable tap of a voltage divider 108 through a resistor R10. Resistor R11 is a feedback resistor. The output of amplifier 106 is connected through a resistor R12 to the base of an output transistor Q2, whose emitter is grounded and whose collector is connected through a resistor R13 to the +5 volt supply. The base of transistor Q2 is coupled to ground by diode D2 to effect turn-off.

As long as the bill present sensing window 44 (FIG. 2) is uncovered, the response of photosensor 52 manifested at the output of operation amplifier 106 is such as to hold transistor Q2 at a +5 volt or logical ONE level. As the leading edge of a bill passing through the monitoring station 24 covers the bill present sensing window, the conductance of photoresistor 52 decreases, reflecting a decrease in the voltage input to operational amplifier 106, as developed across resistor R9. When this input voltage falls below a level determined by the reference input tapped from voltage divider 108, the output of amplifier 106 abruptly drives output transistor Q2 into conduction and the BILL PRES output abruptly falls to a 0 volt or logical ZERO level. Thus, the arrival of a bill in the monitoring station is indicated by the BILL PRES input to the detector logic 70 (FIG. 4) going from a logical ONE to a logical ZERO.

The batch detector circuit 64 is of substantially identical construction as the just described bill detector circuit 62. Specifically, the conductance of the batch sensing photosensor 54 is reflected in the voltage developed across resistor R14 which is compared with a reference voltage tapped from voltage divider 108 through resistor R15 in an operational amplifier 110, again functioning as a schmidt trigger. Resistor R16 is a feedback resistor. The output of operational amplifier 110 is connected through a resistor R17 to the base of an output transistor Q3, whose base is coupled to ground by a diode D3 to effect turn-off. The emitter of this transistor is grounded, while its collector is connected through resistor R18 to the +5 volt supply. The BATCH SEN output taken from its collector switches from +5 volts, logical ONE, to 0 volts, logical ZERO, as long as the batch sensing window 54 (FIG. 2) is covered by either a bill or a batch separator card passing through the monitoring station 24.

Figure 6:
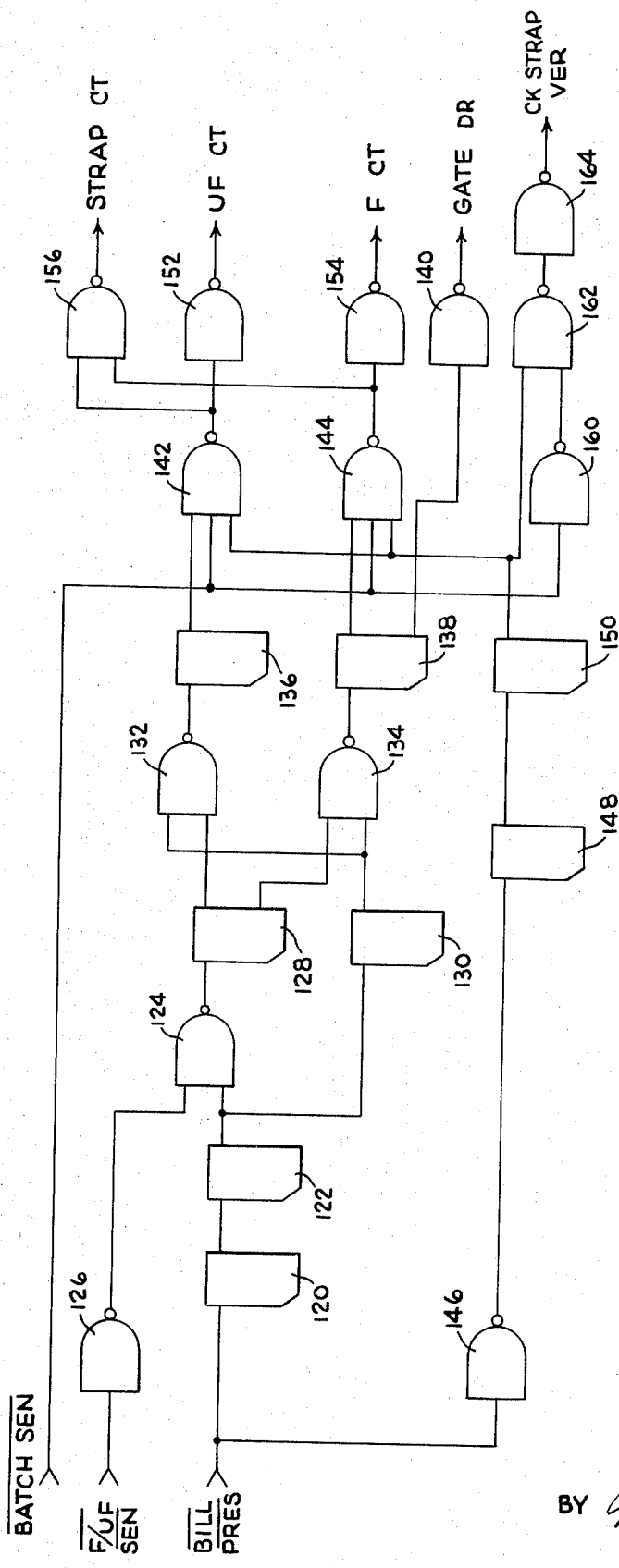
FIG. 6 is a detailed logic block diagram of the detector signal logic circuitry of FIG. 4.

The detector logic 70, considered generally in connection with FIG. 4, is disclosed in detail in FIG. 6. When the BILL PRES input from the bill detector circuit 62 goes through a negative transistion from a logical ONE to a logical Zero, signifying the arrival of a bill in the monitoring station 24, a monostable multivibrator 120 is triggered into a pulse cycle of approximately 13 milliseconds. This output pulse, having a logical ONE significance, is supplied as an enabling input to a NAND gate 124. The F/UF SEN input from the fit/unfit detector circuit 60 is connected through an inverter 126 to the other input of NAND gate 124.

It will be recalled that the F/UF SEN input is a logical ONE if the bill is fit and a logical ZERO if unfit. Inverter 126 merely reverses this convention such that NAND gate 124 receives a logical ONE enabling input when the bill is detected as being unfit. If during the pulse interval of multivibrator 122, the output of inverter 126 goes to a logical ONE, NAND gate 124 is fully enabled and its output, normally sitting at a logical ONE, goes to a logical ZERO. This ONE to ZERO transition is used to trigger a monostable multivibrator 128 into a 20 millisecond pulse cycle each time an unfit bill passes through the monitoring station.

It is seen that the provision of multivibrators 120 and 122 operates to delay the time at which the fitness output signal F/UF SEN is observed, until the central portion of a bill passing through the monitoring station is framed in fitness sensing window 42 (FIG. 20).

On the trailing edge of the 13 millisecond pulse output generated by multivibrator 122, a monostable multivibrator 130 is triggered to generate a 2 millisecond pulse, which is used to enable NAND gates 132 and 134. The set output of multivibrator 128 is applied as the other input to NAND gate 132, while its reset output is applied at the other input to NAND gate 134. If multivibrator 128 is triggered into its 20 millisecond pulse cycle, signifying an unfit bill, its set output to NAND gate 132 goes to a logical ONE for 20 milliseconds, while its reset output to NAND gate 134 goes to a logical zero for 20 milliseconds. On the other hand, if this multivibrator is not triggered from the output of NAND gate 124, signifying that the bill is fit, its set output stays at a logical ZERO and its reset output is a logical ONE.

Thus, the strobing pulse generated by multivibrator 130 enables NAND gate 132, and its output triggers a multivibrator 136 into a 40 millisecond pulse cycle if the bill is unfit. Conversely, if the bill is fit, the strobing pulse enables NAND gate 134, and its output goes from a logical ONE to a logical ZERO to trigger a multivibrator 138 into a 40 millisecond pulse cycle. The reset output of multivibrator 138 goes from a logical ONE to a logical ZERO and is inverted in an inverter 140 to generate the signal GATE DR to the gate driver 76 (FIG. 4). Referring to FIG. 1, the gate elements 34 are rocked upwardly to intercept the fit bill exiting from the monitoring station 24, routing it downwardly onto conveyor 30 for deposit into the fit hopper 14. On the other hand, if multivibrator 138 is not triggered from the output of NAND gate 134, its reset output remains a logical ONE, which is inverted to a logical ZERO by inverter 140, and with the gate driver 76 is not actuated. Consequently, the bill exiting from the monitoring station, detected as being unfit, is routed by virtue of the inactive or quiescent position of the gate elements 34, onto conveyor 28 for deposit in the unfit hopper 12 (FIG. 1).

Still referring to FIG. 6, the set output of multivibrator 136 is applied to one input of a three input NAND gate 142, while the set output of multivibrator 138 is applied to one input of a three input NAND gate 144. The second input to each of these NAND gates is the input BATCH SEN from the batch detector circuit 64. It will be recalled that this input is a logical ZERO as long as a bill or a batch separator card is detected as being present in the monitoring station. The input BILL PRES is inverted in an inverter 146 such that, as soon as a bill or a batch separator card uncovers window 44, the output of inverter 146 goes from a logical ONE to a logical ZERO to trigger a multivibrator 148 into a one millisecond pulse cycle. On the trailing edge of this 1 millisecond pulse, a second one millisecond monostable multivibrator 150 is triggered into operation. The pulse output of multivibrator 150 is used to strobe NAND gates 142 and 144. The purpose of multivibrators 148 and 150 is to delay the effect on NAND gates 142 and 144 of the signal transition of the BILL PRES input so that it does not coincide in time with the signal transition of the BATCH SEN input.

If, by the time the strobing pulse issues from multivibrator 150, the batch sense input BATCH SEN has returned to a logical ONE, either NAND gate 142 or NAND gate 144 will be fully enabled, depending upon which one of the multivibrators 136 or 138 was triggered. If multivibrator 136 was triggered into its 40 millisecond pulse cycle to signify that the bill is unfit, NAND gate 142 is fully enabled, and its output goes from a logical ONE to a logical ZERO, which is inverted by an inverter 152 to provide an unfit count pulse UF CT to the unfit counter 74 disclosed generally in FIG. 4. On the other hand, if multivibrator 138 was triggered into its 40 millisecond pulse cycle, signifying that the bill is fit, NAND gate 144 is fully enabled and its output goes from a logical ONE to a logical ZERO, which is inverted in inverter 154 to provide a fit count pulse F CT to the fit counter 72 (FIG. 4). The outputs of NAND gates 142 and 144 are gated together in a NAND gate 156, whose output goes from a logical ZERO to a logical ONE to provide a strap count pulse STRAP CT to strap counter 76 (FIG. 4) each time either NAND gates 142 or 144 goes through a ONE to ZERO transition.

Still referring to FIG. 6, the BATCH SEN input is inverted in an inverter 160 and gated in a NAND gate 162 with the strobe pulse generated by multivibrator 150. If, during the occurrence of the strobe pulse, the BATCH SEN input is still a logical ZERO, meaning that bill present sensing window 44 is uncovered, while batch sensing window 46 remains covered (FIG. 2), NAND gate 162 is fully enabled. It will be seen that this situation can only occur if one of the batch separator cards 56 or 58 (FIG. 3) is passing through the monitoring station. The output of NAND gate 162 goes through a logical ONE to logical ZERO transition, which is inverted in an inverter 164 to provide a check strap verification pulse CK STRAP VER as each batch separator card leaves the monitoring station.

It will be recalled that one of the batch separator cards, card 56, has an opaque central portion such that it is assorted as an unfit bill, while the other, card 58, has a central cutout 58b (FIG. 3) so that it is sorted as a fit bill. Thus while one or the other of multivibrators 136 and 138 is triggered in response to the passage of the batch separator cards through the monitoring station, no counts are generated since NAND gates 142 and 144 are still disabled since the BATCH SEN input has not yet returned to a logical ONE. This is due to the fact that the tab portion of the batch separator cards still cover batch sensing window 46 during the time of strobing pulse generated by multivibrator 150.

The details of the feed logic 78 and the add clock pulse logic 82 are shown in FIG. 7. It will be recalled from the discussion of the overall block diagram of FIG. 4 that the signal B COMP is transmitted from the strap counter 76 to the feed logic 78 when the count in the particular currency strap being sorted reaches one hundred bills. This signal, a logical ONE, is supplied, as seen in FIG. 7, to a NAND gate 180 together with the two check strap verification pulses CK STRAP VER from detector logic 70 of FIG. 6. If the signal B COMP is a logical ONE, meaning that the strap counter 76 did count to one hundred, the first check strap verification pulse is passed by NAND gate 180 and inverted in an inverter 182, such that its trailing edge is effective to trigger a flip-flop 184 from its reset to its set state. The resulting logical ONE set output of flip-flop 184 is utilized to qualify a pair of four input NAND gates 186 and 188 in the add clock pulse logic 82. This qualifying or enabling input is the add clock enable signal ADD CLK ENA generally considered in connection with FIG. 4. A clock pulse generator 190 supplies clock pulses to each of NAND gates 186 and 188 and to the toggling input of a flip-flop 192. Each clock pulse is effective to trigger flip-flop 192 to its opposite state, and thus when it is in its set state, its set output qualifies NAND gate 186 and when it is in its reset state, its reset output qualifies NAND gate 188.

It will be recalled from FIG. 4 that the output F COMP from comparator 88 and the output UF COMP from comparator 90 are supplied to the add clock pulse logic 82. These outputs are a logical ZERO so long as the content of the fit add clock counter 84 is different from that of the fit counter 72 and the content of the unfit add clock counter 86 is different from that of the unfit counter 74.

As seen in FIG. 7 the output F COMP is inverted to a logical ONE by an inverter 194 to qualify NAND gate 86, while the output UF COMP is inverted to a logical ONE by an inverter 196 to qualify NAND gate 186. Thus, if strap count verification is obtained, such that flip-flop 184 is set by the first check strap verification pulse CK STRAP VER, and if the count contents of the fit and unfit add clock counters are unequal to the contents of the fit and unfit counters, respectively, the clock pulses generated by add clock generator 190 are gated alternately through NAND gates 186 and 188. The pulses appearing at the output of NAND gate 186 are inverted in an inverter 198 to become the unfit add clock pulses UF ADD CLK for incrementing the unfit add clock counter 86. The pulses at the output of NAND gate 188 are inverter in an inverter 200 to become the fit add clock pulses F ADD CLK for incrementing the fit add clock counter 84. When the unfit add clock pulses have incremented the unfit add clock counter 86 to equal the count contained in the unfit counter 74, the output UF COMP from comparator 90 (FIG. 4) goes to a logical ONE which, when inverted by inverter 196, disables NAND gate 186 to terminate the unfit add clock pulses. Similarly, when the fit add clock counter 84 is incremented by the fit add clock pulses to a count equaling the count contained in the fit counter 72, the output F COMP from comparator 88 goes to a logical ONE, which is inverted by inverter 194 to disable NAND gate 188 and terminate the fit add clock pulses.

The pulse outputs from NAND gates 186 and 188 are combined in a NAND gate 202 such that each add clock pulse, fit and unfit, provides a total clock pulse TOT CLK for incrementing the total counter 92 seen in FIG. 4.

The pulse rate of add clock generator 190 is such that updating of the counts of the fit and unfit and clock counters is completed before the next check strap verification pulse gated through NAND gate 180 is effective to reset flip-flop 184, thereby disabling NAND gates 186 and 188. Since flip-flop 184 is triggered on the trailing edges of the check strap verification pulses, its set output qualifies a NAND gate 204, such that the second occurring check strap verification pulse is gated through as a verification reset pulse VER RST.

Figure 8:
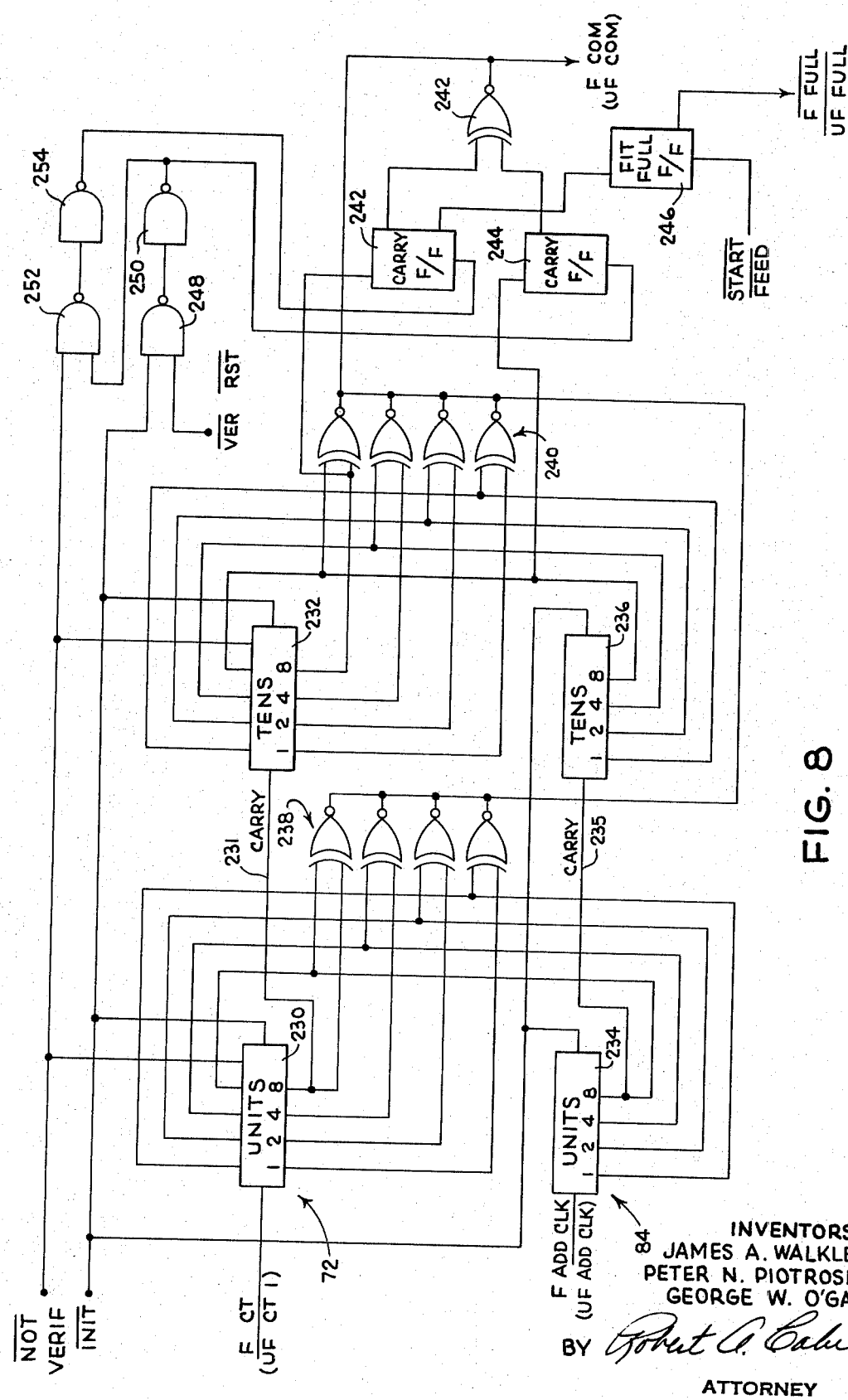
FIG. 8 is a detailed logic block diagram of either the fit counter, fit add clock counter and associated comparator or the unfit counter, unfit add clock counter and associated comparator, all of FIG. 4.

Still referring to FIG. 7, the signal B COMP, issuing from the strap counter 76 (FIG. 4), is inverted in an inverter 206 to qualify a NAND gate 208 as long as the strap counter does not register a count of 100. Thus if, at the time when the first check verification pulse CK STRAP VER comes along, the strap counter 76 does not contain a one hundred count, NAND gate 208 is enabled and NAND gate 180 is disabled. As a consequence, the updating of the add clock counters is inhibited and the first check strap verification pulse passes through NAND gate 208 to one input of a three input NAND gate 210. The other two inputs to this gate are an initialize signal INIT and a stop feed signal STOP FEED. These inputs are initiated by the operator respectively to initialize or clear the system and to stop the feeding of currency in the event of a malfunction. Normally the operator inputs INIT and STOP FEED are logical ones so as to qualify NAND gate 210. Thus, if strap count verification is not obtained, the resulting pulse output from NAND gate 208 is passed through NAND gate 210 and inverted by an inverter 212 to provide a not verified signal NOT VER which, as will be seen in FIG. 8, is supplied to the various fit and unfit counters. Since the output of NAND gate 208 normally sits at a logical ONE, the initiation of an initialize or stop feed function by the operator is also effective to generate the signal NOT VER, signified by a logical ONE to ZERO transition.

This normal logical ONE at the output of inverter 212 is also supplied as one input to a NAND gate 214, together with the fit full signal F FULL from the fit counter 72 and the unfit full signal UF FULL from the unfit counter 74 (FIG. 4). Until their associated counters achieve a one hundred count, these inputs are also a logical ONE, and thus the output of NAND gate 214 normally sits at a logical ZERO which is inverted to a logical ONE by inverter 216.

Consequently, if the output of inverter 212 goes from a logical ONE to a logical ZERO to generate the not verified signal NOT VER or either of the fit full F FULL or unfit full UNF FULL inputs go through a logical ONE to ZERO transition, the output of NAND gate 214 goes to a logical ONE which is inverted by inverter 216 to a logical ONE to ZERO transition effective to trigger a flip-flop 218 to its set state. The reset output of this flip-flop provides the feed drive signal FEED DR to the feed brake/clutch drive 80 (FIG. 4). As long as flip-flop 218 is reset, the feed drive output FEED DR is a logical ONE which controls the driver circuit 80 to continue the feeding of currency. However, when flip-flop 218 is set by the output of NAND gate 214, the feed drive output goes to a logical ZERO and the feed brake/clutch drive 80 of FIG. 4 is controlled to halt currency feed.

It is thus seen that if strap count verification is not achieved, flip-flop 218 is set to halt currency feeding so that the operator can retrieve the sorted bills of the last strap which prove not to have one hundred bills. Similarly, if the fit counter 72 has accumulated a count of 100, flip-flop 218 is also set to stop the feed and permit the operator to insert a strap separator card in the fit hopper 14 (FIG. 1). Also, when the unfit counter 74 reaches a one hundred count, flip-flop 218 is also set to stop the feed and permit the operator to place a strap separator card in the unfit hopper 12. To restart the feed, the operator generates a start feed input START FEED, which drives flip-flop 218 to its reset state.

Fit counter 72, fit add clock counter 84, and comparator 88, generally considered in connection with FIG. 4, are shown in detail in FIG. 8. The exact same construction prevails for unfit counter 74, unfit add clock counter 86, and comparator 90 prevails, and thus the single FIG. 8 is believed adequate for full disclosure of all of these components.

Fit counter 72, like unfit counter 74, consists of a units binary coded decimal (BCD) digit stage 230 and a tens BCD digit stage 232. Similarly, the fit add clock counter 84, as does the unfit add clock counter 86, consists of a units BCD digit stage 234 and a tens BCD digit stage 236. Fit count pulses F CT supplied from the detector logic 70 of FIG. 6 increment units digit stage 230 and, with each ten such pulses, a carry pulse is generated on lead 238 to increment the tens digit stage 232 when the eight bit output line goes from ONE to ZERO. Similarly, fit add clock pulses F ADD CLK, supplied from the add clock pulse logic 82 of FIG. 7, increment the units stage 234 of the fit add clock counter 84, and, with each complement of ten such pulses a carry pulse is generated over lead 235 to increment the tens stage 236.

The contents of the units stages 230 and 234 of the fit counter 72 and the fit add clock counter 84, respectively, are compared in a series of four digital NAND gates, commonly indicated at 238, while the contents of the tens stages 232 and 236 are compared in digital NAND gates 240. The outputs of NAND gates 238 and 240 are connected in common with the output of a digital NAND gate 242 to develop the input F COMP to the add clock pulse logic 82 of FIG. 7. It is thus seen that these digital NAND gates make up the comparator 88 disclosed generally in FIG. 4. Corresponding digital NAND gates make up comparator 90. The characteristic of these digital NAND gates is such that as long as their two inputs are either both logical ONES or both logical ZEROS, their output is a logical ONE. For the comparator output F COMP to go to a logical ONE, each and every one of the digital NAND gates of comparator 88 must provide a logical ONE output.

The inputs to digital NAND gate 242 are derived from the set outputs of a pair of carry flip-flops 242 and 244. Carry flip-flop 242 is set when the binary 8 output of the tens digit stage 232 of the fit counter 72 goes from a ONE to a ZERO, meaning that the fit counter has counted to 100. Similarly, the binary 8 output of the tens digit stage 236 sets carry flip-flop 244 as the fit add clock counter counts to 100. Consequently, in order to equalize the contents of the fit add clock counter and the fit counter the stages of the carry flip-flops 242 and 244 must also be compared pursuant to generating the compare output F COMP, and in the case of unfit and unfit add clock counters, in generating the compare output UF COMP.

When carry flip-flop 242 is set incident to the fit counter 72 reaching a 100 count, its set output goes from a ONE to a ZERO to trigger a flip-flop 246 to it set state. The reset output of this flip-flop, which supplies the fit full signal F̄ F̄ŪL̄L̄ to the feed logic 78 of FIG. 7, goes to a ZERO and, as previously described, flip-flop 218 is set from the output of NAND gate 214 to disengage the currency feed drive. After the operator has placed a strap separator card in the appropriate output hopper, the start feed signal is generated to reset flip-flops 218 (FIG. 7) and 246 (FIG. 8).

Completing the description of FIG. 8, the initialize signal INIT is connected to zero each of the counter stages and also is connected through a NAND gate 248 and an inverter 250 to reset carry flip-flop 244. In addition, the initialize signal is connected from the output of inverter 250 through NAND gate 252 and inverter 254 to reset the other carry flip-flop 242. The verification reset signal V̄ĒR̄ R̄S̄T̄ generated in the feed logic 78 of FIG. 7 after the add clock counters have been updated is coupled through NAND gate 248 and inverter 250 to reset carry flip-flop 244 and also through NAND gate 252 and inverter 254 to reset carry flip-flop 242.

Finally, the not verified signal N̄ŌT̄ V̄ĒR̄ is used to condition the units digit stage 230 and the tens digit stage 232 of the fit counter 72 (and of unfit counter 74) to accept the units and tens digits of the count contained in the fit add clock counter 84 (and in the unfit add clock counter 86), thus erasing the count to which the fit counter (and unfit counter) had been incremented by the fit count pulses FCT (and unfit count pulses UF CT) during the sorting of the last strap. This has the effect of backdating the fit and unfit counters to the counts they held prior to the sorting of the last strap which, due to the presence of the not verified signal N̄ŌT̄ V̄ĒR̄, proved not to contain 100 bills. The not verified signal is also coupled through NAND gate 252 and inverter 254 to reset carry flip-flop 242.

The operation of the fit counter and the fit add clock counter of FIG. 8 and, by the same token, the operation of the unfit counter and the unfit add clock counter may perhaps best be understood by considering a few examplary straps sorting runs assume that the counters have been initialized or zeroed and a first strap is sorted. If this first strap contained sixty fit bills, the fit counter 72 is incremented to sixty by the fit count pulses F CT. If strap count verification is obtained, the fit add clock counter 84 is incremented by fit add clock pulses F ADD CLK to a count of 60 matching the count held in the fit counter. Obviously, the unfit count counted to 40 and the unfit add clock counter is updated to 40 by unfit add clock pulses UF ADD CLK.

If the next strap contains 70 fit bills, when the first forty fit bills are sorted out the fit counter 72 cycles through one hundred to set carry flip-flop 242 which, in turn, sets the fit full flip-flop 246. Its reset output F̄ FULL is effective to halt the feed of currency at this point, permitting the operator to place a strap separator card in the fit hopper. Feed is restarted and, in concluding the sorting of this second strap, the fit counter is incremented to 30, while the unfit counter increments to 70. Assuming again that strap veritification is obtained, fit add clock pulses increment the fit add clock counter 84 through one hundred whereupon carry flip-flop 244 is set and on to 30. The unfit add clock counter is updated to 70. Since the outputs of all of the digital NAND gates including NAND gate 242 are logical ONES when the fit add clock counter reaches 30, the compare output F COMP terminates the fit add clock pulses. The verification reset signal VER RST is then generated by the feed logic circuit 78 to reset both carry flip-flops 242 and 244.

Now assume that the next strap contains 40 fit bills, but strap count verification is not achieved. The fit counter 72 is incremented from 30 to 70 by the fit count pulses while the fit add clock counter remains at 30. Meanwhile, feeding is halted momentarily when the unfit counter reaches 100 to permit the operator to place a strap separator card in the unfit hopper. Since the strap counter did not achieve a count of one hundred when the batch separator cards pass through the monitoring station, the not verified signal N̄ŌT̄ V̄ĒR̄ is generated by the feed logic circuit 78 of FIG. 7 to halt the feeding of currency and coincidentally to condition the units and tens digit stages of the fit counter to accept the 30 count read in from the fit add clock counter, thereby erasing the 70 count it had achieved with the sorting of this third stage. Thus, the fit counter is backdated to the count it contained prior to the sortings of this strap, i.e., 30. At the same time the unfit counter is backdated from the unfit add clock counter to 70. Incidentally, the fact that strap count verification is not achieved prevented the generation of the add clock enable signal ADD CLK ENA to the add clock pulse logic 82 of FIG. 7, and thus the fit and unfit add clock counters are not incremented. The sorted fit and unfit bills of this third strap are removed from the output hoppers and the feeding of currency is restarted.

From the foregoing description, it is seen that the present invention provides a method and apparatus for reliably and rapidly sorting currency for fitness acording to a highly objective, yet readily adjustable standard. Feed rates of 500–600 bills per minute have been achieved. The recognition effectiveness of the invention to marginally fit, or, conversely, marginally unfit bills has been found to be as high as 80–85 percent. The accounting aspects of the invention offer tremendous operator appeal, since not only is strap count verification automatically obtained incident to fitness sorting, but also the sorted bills can also be conveniently segragated into straps of 100 bills.

It is contemplated that the present invention will be utilized mainly in the fitness sorting of 1 and 5 dollar bills, for which counterfeiting is not a particular problem. However, it is contemplated that counterfeit detection provisions may be included in the monitoring station 24 of the invention. It is also contemplated that the monitoring station may also include an optical detector adapted to monitor the denomination of the bills passing therethrough. Thus, for example, if the system is set up to sort 1 dollar bills according to fitness and a 5 dollar bill, inadvertently included in a currency strap, passes through the monitoring station, the denomination detector is actuated to halt the currency feed, such as by way of an input to NAND gate 214 (FIG. 7), or otherwise alert the operator. Also, the monitoring station may included a detector adapted to sense the simultaneous passage of several bills therethrough. This "double" detector would be implemented to also halt currency feed by triggering flip-flop 218 (FIG. 7).

It will thus be seen that the objects set forth above, among those made apparent from the preceding description, are efficiently attained and, since certain changes may be made in carrying out the above method and in the construction set forth without departing from the scope of the invention, it is intended that all matter contained in the above description or shown in the accompanying drawings shall be interpreted as illustrative and not in a limiting sense.

Having described our invention, what we claim as new and desire to secure by Letters Patent is:

1. A system for sorting currency according to fitness for circulation, wherein the currency is batched in straps, each normally including a predetermined fixed number of bills, the system comprising, in combination:
   A. a monitoring station;
   B. an input hopper for accommodating a plurality of said straps,
   C. a batch separator card for segregating the straps of bills as accommodated in said input hopper;
   D. first receiving means;
   E. second receiving means;
   F. means for feeding individual bills of currency from said input hopper seriatim through said monitoring station;
   G. a diverter for routing bills exiting from said monitoring station into either of said first and second receiving means;
   H. a source of irradiating the bills while in transit through said monitoring station with radiation to which each bill exhibits a degree of transmittance varying with its relative fitness;
   I. a fitness radiation sensor located in said monitoring station for generating an electrical response proportional to the transparency of each bill to said radiation from said source; and
   J. means located at said monitoring station for defining a fitness sensing aperture optically aligned between said source and said fitness sensor for limiting the irradiation of each bill passing through said monitoring station to a predetermined limited area thereof, and
   K. a detector operating in response to the arrival of each bill in said monitoring station to derive a timing signal for delaying the operative effect of said fitness sensor electrical response until each bill is properly located relative to said aperture;
   L. a batch card detector actuated in response to the passage of each batch separator card through said monitoring station for deriving a count verification signal;
   M. means for processing the electrical response of said fitness sensor to the incident radiation transmitted through each bill relative to a predetermined reference transparency value, said processing means
      1 operatively connected to control said diverter such as to accumulate fit bills in said first receiving means and unfit bills in said second receiving means, and
      2 processing said fitness sensor electrical response in conjunction with said timing signal to derive a fit count pulse with the passage of each fit bill through said monitoring station and an unfit count pulse with the passage of each unfit bill through said monitoring station;
   N. a fit counter for accumulating said fit count pulses;
   O. an unfit counter for accumulating said unfit count pulses;
   P. a strap counter for accumulating said fit and unfit count pulses up to said predetermined number and thereupon to generate an output signal; and
      Q. means responsive to said count verification signal and said strap counter output signal for halting said feeding means in the event said signals fail to occur coincidentally.

2. The system defined in claim 1, wherein a pair of said batch separator cards are utilized to segregate each strap as accommodated in said input hopper, one of said batch separator cards of each pair having the optical characteristics of a fit bill and the other having the optical characteristics of an unfit bill, whereby said fitness sensor electrical responses obtained during the passage of said batch separator card pair through said monitoring station controls said diverter to route said one batch separator card into said first receiving means and said other batch separator card into said second receiving means, thus to segregate the sorted bills of the various straps as accumulated in said first and second receiving means.

3. The system defined in claim 2, wherein said fit and said unfit counters respectively generate fit full and unfit full signals each time they are incremented to said predetermined number, said system further including means responsive to said fit full and said unfit full signals for halting said feeding means.

4. The system defined in claim 1, which further includes:
   A. A supplemental fit counter;
   B. a supplemental unfit counter; and
   C. means enabled by the coincidence of said count verification signal and said strap counter output signal to increment said supplemental fit and unfit counters to the counts contained in said fit and unfit counters, respectively.

5. The system defined in claim 4, which further includes means responsive to the lack of coincidence between said count verification signal and said strap counter output signal for inhibiting incrementation of said supplemental fit and unfit counters and for conditioning said fit counter to accept the counter content of said supplemental unfit counter, whereby to return said fit and said unfit counters to the counts they contained prior to the sorting of the last strap.

6. The system defined in claim 4, which further includes a total counter for counting each incrementation of said supplemental fit and unfit counters.

7. A system for sorting currency according to fitness for circulation wherein the currency is batched in straps, each normally including a predetermined fixed number of bills, the system comprising, in combination:
  A. a monitoring station;
  B. an input hopper for accumulating a plurality of straps;
  C. a batch separator card for segregating straps of bills as accommodated in said input hopper;
  D. first receiving means;
  E. second receiving means;
  F. means for feeding individual bills from said input hopper seriatim through said monitoring station;
  G. a diverter for routing bills exiting from said monitoring station to either said first or second receiving means;
  H. means in said monitoring station for testing each successive bill for fitness in relation to a predetermined fitness standard and deriving a digitized fitness signal having a first logical significance for each bill determined to be fit and a second logical significance for each bill determined to be unfit;
  I. a batch card detector actuated in response to the passage of each batch separator card through said monitoring station for deriving a count verification signal;
  J. logic means for processing said fitness signal to control said diverter so as to accumulate fit bills in said first receiving means and unfit bills in said second receiving means, said logic means further processes said fitness signal to derive a fit count pulse with the passage of each fit bill through said monitoring station and an unfit count pulse with the passage of each unfit bill through said monitoring station;
  K. counting means controlled from said logic means for accumulating said fit count pulses in a fit counter and said unfit count pulses in an unfit counter;
  L. a strap counter for accumulating fit and unfit count pulses up to said predetermined number and thereupon to generate an output signal; and
  M. means responsive to said count verification signal and said strap counter output signal for halting said feeding means in the event that said signals fail to occur coincidentally.

8. The system defined in claim 7, wherein a pair of batch separator cards are utilized to segregate each strap as accommodated in said input hopper, one of said batch separator cards of each pair adapted to actuate said testing means to derive a fitness signal of said first logical significance and the other adapted to actuate said testing means to derive a fitness signal of said second logical significance such that, upon passage of each said batch separator card pair through said monitoring station, said diverter is controlled to route said one batch separator card into the first receiving means and said other batch separator card into said second receiving means, thus to segregate the sorted bills of the various straps as accumulated in said first and second receiving means.

9. The system defined in claim 8, wherein said fit and said unfit counters respectively generate fit full and unfit full signals each time they are incremented to said predetermined number, said system further including means responsive to said full and said unfit full signals for halting said feeding means.

10. The system defined in claim 7, which futher includes:
  A. a supplemental fit counter;
  B. a supplemental unfit counter; and
  C. means enabled by the coincidence of said counter verification signal and said strap counter output signal to increment said supplemental fit and unfit counters to the counts contained in said fit and unfit counter, respectively.

11. The system defined in claim 10, which further includes means responsive to the lack of coincidence between said count verification signal and strap counter output signal for inhibiting incrementation of said supplemental fit and unfit counters and for conditioning said fit counter to accept the count content of said supplemental fit counter and to condition said unfit counter to accept the count content of said supplemental unfit counter, whereby to return said fit and said unfit counters to the counts they contain prior to the sorting of the last strap.

12. The system defined in claim 10, which further includes a total counter for counting each incrementation of said supplemental fit and unfit counters.

* * * * *